Figure 1:
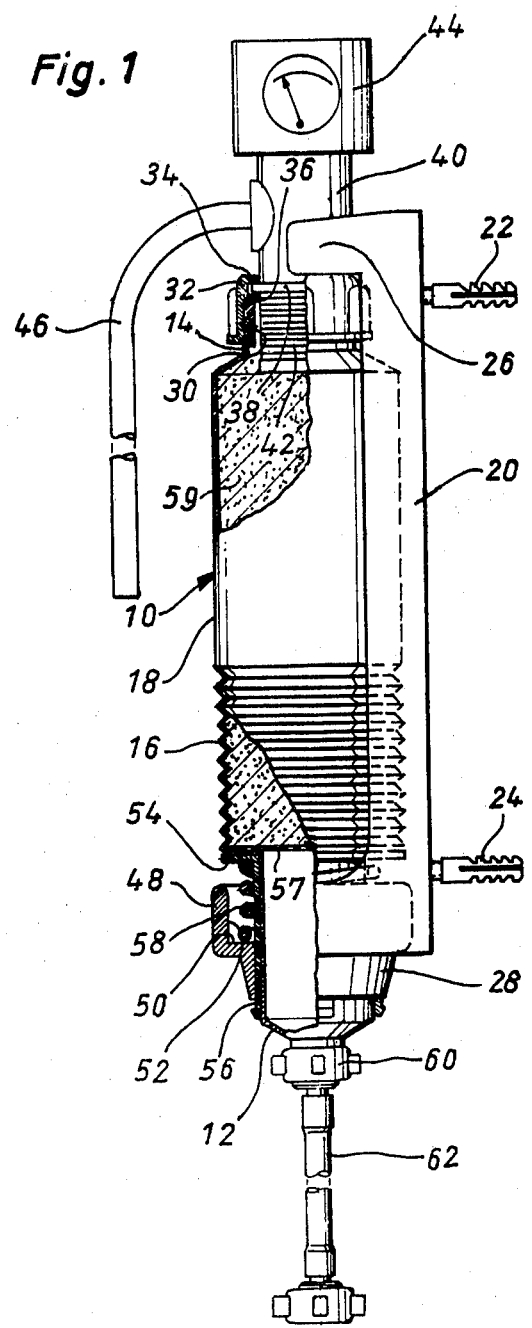

United States Patent [19]

Herrmann

[11] 4,294,699

[45] Oct. 13, 1981

[54] APPARATUS FOR PURIFYING A LIQUID BY ION-EXCHANGE

[76] Inventor: Willy Herrmann, Strombergstrasse 21, 7140 Ludwigsburg, Fed. Rep. of Germany

[21] Appl. No.: 144,926

[22] Filed: Apr. 29, 1980

Related U.S. Application Data

[63] Continuation of Ser. No. 952,635, Oct. 19, 1978, abandoned.

[30] Foreign Application Priority Data

May 29, 1978 [DE] Fed. Rep. of Germany ....... 2823432

[51] Int. Cl.$^3$ ............................................. B01D 15/00
[52] U.S. Cl. ................................... 210/287; 210/263; 210/351
[58] Field of Search .................. 210/263, 287, 351

[56] References Cited

U.S. PATENT DOCUMENTS

| 247,117 | 9/1881 | Scharff | 210/287 |
|---|---|---|---|
| 3,180,825 | 4/1965 | Couvreur et al. | 210/351 X |
| 3,965,000 | 6/1976 | Mikule et al. | 210/351 X |
| 4,062,773 | 12/1977 | Leonard | 210/351 X |

Primary Examiner—Frank A. Spear, Jr.
Attorney, Agent, or Firm—Toren, McGeady & Stanger

[57] ABSTRACT

A bed of particulate ion-exchange material is confined in the cavity of a container bounded by a wall portion of the container which is movable inward of the cavity. Supply and discharge conduits communicate with respective portions of the cavity for supplying the liquid to be purified, and for discharging from the cavity the liquid purified by contact with the particulate material. A biasing device engages the container outside the cavity and biases the movable wall portion inward of the cavity, whereby the particulate material is kept under compressive stress, and channeling due to shrinkage of the bed is avoided.

4 Claims, 2 Drawing Figures

APPARATUS FOR PURIFYING A LIQUID BY ION-EXCHANGE

This is a continuation of application Ser. No. 952,635 filed on Oct. 19, 1978, now abandoned.

This invention relates to the purification of liquids, and particularly to apparatus for purifying a liquid.

It is common practice to confine a bed of particulate ion-exchange material in a container, to feed the liquid to be purified, such as hard water, to one end of the container, and to withdraw the purified liquid, such as softened water, from the other end. During normal operations, the bed of ion-exchange material, usually a granular synthetic resin, tends to shrink, partly because of chemical interaction with the process liquid, and partly by displacement of individual particles by the flowing liquid. Portions of the bed become practically impervious to liquid flow, and the flow resistance of others decreases. The resulting channeling causes inadequately purified liquid to be discharged before the ion-exchange material is exhausted.

It has been proposed to prevent channeling by enclosing a resilient body, such as a piece of cellular plastic, together with the ion-exchange material in the container, and to pack the container so tightly that the resilient body keeps the ion-exchange material under compressive stress. The compressible cellular material creates a new problem when the apparatus is used intermittently for the purification of drinking water or like liquid which normally contains small amounts of microorganisms. The microorganisms can neither grow on the smooth inner walls of the container nor on the ion-exchange resin, nor can they accumulate in significant amounts on cellular plastic continuously swept by a stream of liquid. During intermittent use, however, microorganisms readily multiply on the sponge-like material in the absence of water flow, and are discharged in objectionable amounts when flow is resumed.

It is a primary object of this invention to avoid the shortcomings of the known compressible bodies without loss of their beneficial effect.

The invention provides apparatus for purifying a liquid in which a container has a wall portion bounding a cavity in the container and movable inward of the cavity. A bed of particulate material is confined in the cavity in pressure-transmitting contact with the movable wall portion. The liquid to be purified is supplied to a portion of the cavity, and liquid purified by contact with the bed is discharged from another cavity portion. A biasing device engages the container outside its cavity and biases the movable wall portion inward of the cavity, whereby compressive stress is exerted on the particulate material and channeling is avoided without the need for compressible material in the container cavity.

Figure 2:
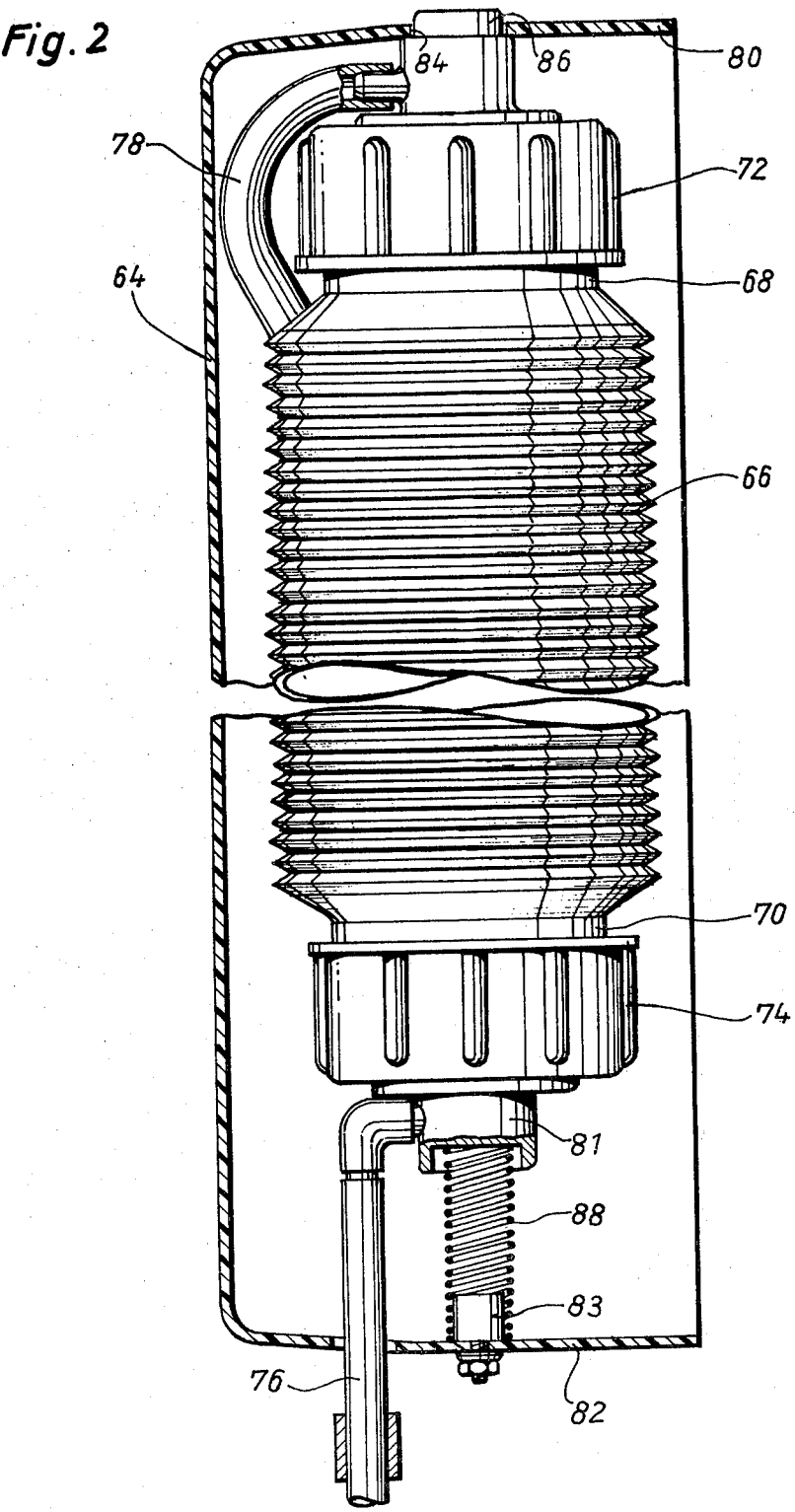

Other features, additional objects, and many of the attendant advantages of this invention will readily be appreciated as the same becomes better understood by reference to the following detailed description of preferred embodiments when considered in conjunction with the appended drawing in which:

FIG. 1 shows ion-exchange apparatus of the invention in elevation, portions being broken away to show internal structure; and FIG. 2 is a fragmentary, partly sectional view of modified apparatus.

Referring initially to FIG. 1, an elongated, plastic cartridge 10 has a generally circular cross section at right angles to its normally vertical axis. The axially terminal portions 12, 14 of the cartridge are cylindrical over much of their length, but narrower than the container constituted by the main body of the cartridge whose lower part 16 is accordion-pleated, while the upper part 18 is smoothly cylindrical. The cartridge 10 is mounted on a supporting bracket 20 provided with two horizontal, expandible plugs 22, 24 normally fastening the bracket to a wall. The cartridge 10 is releasably secured to the bracket 20 between two vertically spaced integral abutments 26, 28.

The tubular upper, terminal cartridge portion 14 is clamped between an inner sleeve 30 and an outer sleeve 32. Annular flanges 34, 36 project radially inward from the top edges of the two sleeves in axially spaced relationship and receive therebetween a collar 38 of a tubular connector 40, thereby sealing the cartridge 10 to the coaxial connector 40. The lower end of the connector 40 carries a filter element 42 in the cartridge portion 14. The upper abutment 26 has two arms which extend partly about the connector 40 and whose lower faces are engaged abuttingly by the flange 34 of the outer sleeve 32. The upper end of the connector 40 carries a conductivity gage 44, and a flexible hose 46 radially communicates with the bore of the connector.

The lower abutment 28 has a generally cup-shaped portion 48 including a cylindrical, axial wall 52 and a centrally apertured bottom wall 50. A guide sleeve 56 is axially slidably received in the tubular portion of the abutment 28 extending downward from the bottom wall 50. A flange 54 extending radially outward from the top end of the guide sleeve 56 abuts against the radial shoulder of the cartridge 10 which connects the terminal portion 12 to the accordion-pleated body part 16. The terminal portion 12 is slidably received in the sleeve 56. A helical compression spring 58 is loosely coiled about the sleeve 56 between the bottom wall 50 and the flange 54, thereby biasing the lower end of the container part 16 upward and pressing the cartridge longitudinally against the upper abutment 26.

A flexible radial screen 57 rests in the cavity of the cartridge 10 on the afore-mentioned shoulder connecting the terminal portion 12 to container part 16, and the cavity above the screen 57 to the filter element 42 is packed with a bed of granular ion-exchange resin 59. The spring 58 thus pushes the lower terminal cartridge portion 12 upward and inward of the cartridge cavity and holds the resin particles under pressure. The accordion-pleated part 16 does not offer significant resistance to longitudinal deformation by the strong spring 58 when shrinkage of the bed 59 permits upward movement of the screen 57 and of the flange 54 which backs the screen.

The lower end of the cartridge portion 12 projects from the guide sleeve 56 and is connected to a supply hose 62 by a coupling 60. When the apparatus of FIG. 1 is employed for deionizing drinking water, the hose 62 is connected to a faucet, the ion-exchanger bed contains both cation-exchange and anion-exchange resins, and the low conductivity of the discharged water indicates the performance of the apparatus.

The spring 58 similarly holds the container 16, 18 and its contents under longitudinal compressive stress, when the container is packed with a bed of particulate water-purifying material other than ion-exchange resin. Granular carbon is employed for adsorbing colored material from water, and channeling in the carbon bed due to displacement of individual particles is prevented by the externally applied pressure. Liquids other than water are purified advantageously in the apparatus of the invention by means of particulate materials, the removal of iron salts from acetic acid by ion-exchange being but one example of such other applications.

The modified ion-exchange apparatus shown in FIG. 2 includes a supporting bracket 64 which has the shape of a long and narrow trough normally mounted on a wall in a non-illustrated, conventional manner so that its direction of elongation is vertical. A container 66 for ion-exchange material, not itself visible in FIG. 2, is an accordion-pleated, plastic cylinder whose axially terminal portions are provided with integral, coaxial nipples 68, 70 of reduced diameter. The nipples are threaded externally over respective parts of their axial lengths which are obscured in the drawing by plastic caps 72, 74 threadedly mounted on the nipples in sealing engagement.

Hoses 76, 78 pass through openings in the bracket 64 and communicate with the two ends of the container 66 through axial extensions 86, 87 of the caps 72, 74 respectively. A recess in the extension 87 provides a seat for one end of a helical compression spring 88 whose other end abuts against a transverse end wall 82 of the bracket 64 and is held in position by a stud 83 on the end wall. The extension 86 is secured to the other transverse end wall 80 of the bracket 64 by being partly received in an opening 84 of the end wall 80 and by having a shoulder which abuts against the rim of the opening 84 under the pressure of the spring 88 transmitted to the cap 72 almost entirely by the non-illustrated bed of ion-exchange particles in the container 66. The pleated axial wall of the container 66 yields under the pressure of the spring 88 to the extent permitted by shrinkage of the bed of ion-exchange material confined in the container cavity.

For domestic and similar use, the ion-exchange materials and the associated containers are inexpensive enough to be discarded after exhaustion by the purified water. In the embodiment of FIG. 1, the coupling 60 and hose 62 are removed first. When the spring 58 is compressed by manual downward pressure applied to the container part 18, the adapter 40 may be released from the abutment 26 by bending the pleated container part 16, and the cartridge 10 thereafter is slipped upward out of the sleeve 56. The adapter 40 together with the sleeves 30, 32 and the filter element 42 is withdrawn from the upper nipple 14. A new cartridge is installed by reversing the disassembly operation using a new cartridge 10.

For replacing the container 66 shown in FIG. 2, the hoses 76, 78 are removed first from the extensions 86, 87. Downward pressure manually exerted on the cap 72 causes the spring 88 to be compressed and the extension 86 to be withdrawn from the opening 84. The container 66 together with the caps 72, 74 is now pulled from the bracket 64, the caps are transferred to a new container filled with unused ion-exchange resin which is held between screens in the manner shown at 57 in FIG. 1.

It should be understood, of course, that the foregoing disclosure relates only to presently preferred embodiments, and that it is intended to cover all changes and modifications of the examples herein chosen for the purpose of the disclosure which do not constitute departures from the spirit and scope of the invention set forth in the appended claims.

What is claimed is:

1. Filtering apparatus for treating a liquid such as softening and/or purifying water, comprising an axially elongated hollow tubular body, a bed of particulate ion-exchange material confined in said tubular body, at least a portion of the axial length of said tubular body being compressible for varying the volume within said tubular body, said tubular body having an inlet opening and an outlet opening for flowing a liquid through said bed therein, biasing means for applying compressive force for adjusting the volume within said tubular body when said bed of particulate ion-exchange material shrinks, wherein the improvement comprises a supporting bracket for mounting said tubular body and said bracket being arranged to be secured on a wall, the compressible portion of said tubular body comprises an axially extending tubular bellows portion so that the axial length of said tubular body can be decreased as the volume of said bed of particulate ion-exchange material shrinks, said bracket being elongated in the same direction as said tubular body and having an integral stationary abutment at each of the ends thereof spaced apart in the elongated direction, said tubular body being supported between said support abutments with said biasing means securing said tubular body between said support abutments and said tubular body being removably mounted between said abutments, and said biasing means comprising an axially extending compression spring extending in the elongated direction of said tubular body and support bracket and bearing at one end against one of said abutments and at the other end against said tubular body for applying a compressive force against the bed of ion-exchange material within said tubular body and against said tubular body so that as the volume of the bed of ion-exchange material shrinks said spring maintains the compressive force on the bed and deforms the tubular bellows part in the axial direction relative to the shrinkage of the bed, said compression spring being located exteriorly of said tubular body and said tubular body being displaceable in the elongated direction within said bracket against said compressive spring for removing said tubular body from said bracket.

2. Filtering apparatus, as set forth in claim 1, including an end connection member attached to each of the opposite ends of said tubular body, and said compression spring laterally encircling one of said end connection members.

3. Filtering apparatus, as set forth in claim 1, including an end connection member attached to each of the opposite ends of said tubular body, and said compression spring bearing against one of said end connection members in the axial direction of said tubular body.

4. Filtering apparatus, as set forth in claim 2, including an axially elongated sleeve being axially slidably mounted in said one of said abutments with one end thereof projecting from said one of said abutments toward said tubular body, and one of said end connecting members being slidably mounted within said sleeve, said compression spring laterally encircling said sleeve, said sleeve having a radially outwardly extending flange at the one end thereof, said compression spring bearing against said flange for transmitting compressive force therethrough to said tubular body.

* * * * *